Aug. 8, 1933.  W. H. MEYER  1,920,997
RAILWAY MOTOR TRUCK STRUCTURE
Filed Oct. 8, 1931  3 Sheets-Sheet 3

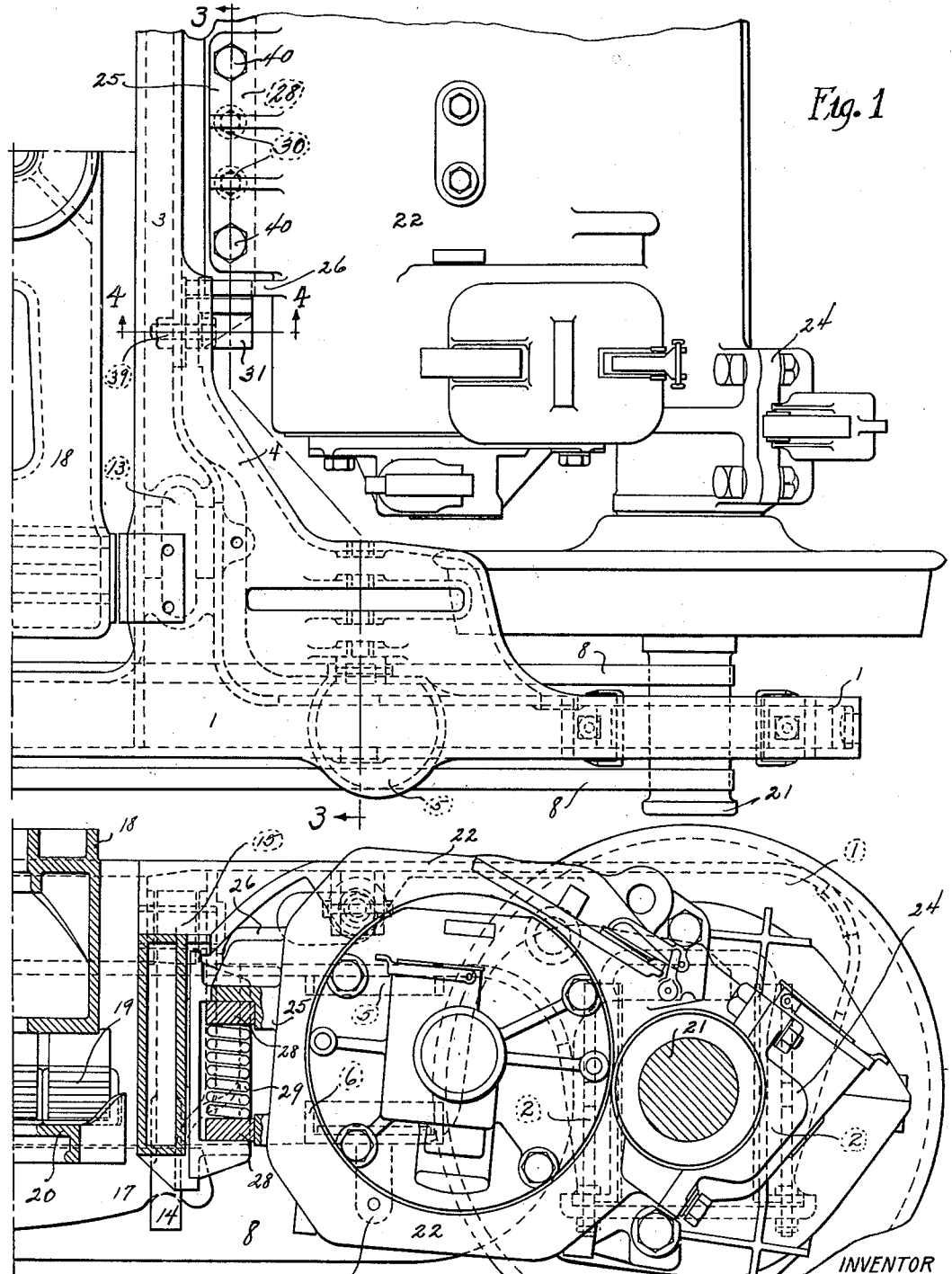

Inventor
William H. Meyer
By Rodney Bedell
Attorney

Patented Aug. 8, 1933

1,920,997

UNITED STATES PATENT OFFICE 1,920,997

RAILWAY MOTOR TRUCK STRUCTURE

William H. Meyer, St. Louis, Mo., assignor to General Steel Castings Corporation, Granite City, Ill., a Corporation of Delaware Application October 8, 1931. Serial No. 567,729

12 Claims. (Cl. 105—139)

The invention relates to means for supporting the motor frames or housings of motor car trucks, and particularly to the type wherein the frame or housing of an electric motor is swivelled at one end or side on the wheel axle to which the motor is gear connected, and is supported at the opposite end or side by means provided on a transverse member of the truck frame.

One object of the invention is to provide a simple, compact, and inexpensive means for securely and yieldingly supporting the motor housing on the transverse member of the truck frame, which means is both readily accessible and adjustable to different positions to respectively provide limited and unobstructed vertical movement of the motor housing in opposite directions relative to its normal positon, the latter movement being for the purpose of making adjustments or repairs to said motor without necessitating the disassembly of other parts of the truck.

Another object of the invention is to provide a strong compact truck transom and to provide adjustable and detachable motor supporting brackets requiring little machining for use with such transom.

The invention consists in all the novel features hereinafter disclosed and illustrated by the various forms shown in the accompanying drawings in which—

Figure 1 is a partial top view of a motor truck showing the invention applied thereto.

Figure 2 is a partial side view of the truck being sectioned in part for clearer illustration.

Figure 3:
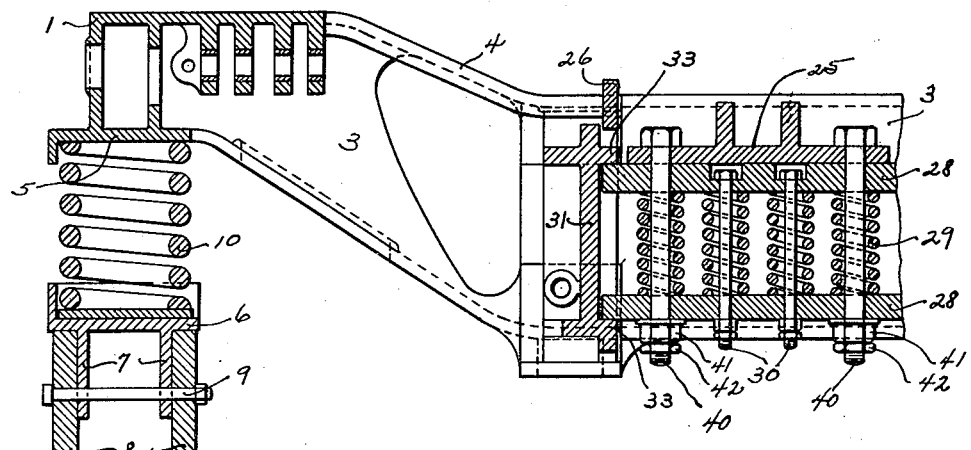
Figure 3 is a transverse vertical section on the line 3—3 of Figure 1.
Figure 4:
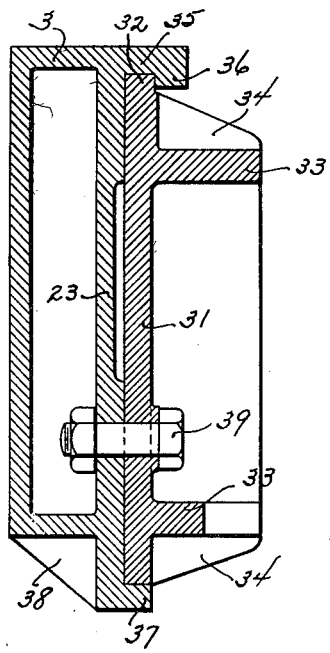
Figure 4 is a detail vertical section on the line 4—4 of Figure 1.

While applicable to other types of power driven trucks, the present invention is shown applied to a truck of familiar form in which the truck frame has limited vertical movement relative to the axle and the motor carried thereby to reduce shocks caused by rail and road bed variations.

A truck frame 1 includes pedestal jaws 2 for receiving axle journal boxes, not shown, and includes an integral transverse transom 3 reinforced by a gusset member 4. Frame 1 is also provided with spring bearing caps 5. Spring seats 6 have flanged portions 7 which are bolted to the equalizer bars 8 by means of bolts 9. Springs 10 yieldingly support the frame. Transoms 3 have slots 13 in which swinging hangers 14 are suspended by pivots 15 and support cross bars 17. Truck bolster 18, bolster springs 19 and spring plank 20 are supported by cross bars 17 thereby permitting swinging movement of the bolster in the frame. An electric motor is mounted on and geared to one of the wheel axles 21 and, if desired, each axle may be provided with a motor. All of the above is well known structure.

The motor housing 22 is interposed between the wheel axle and the adjacent side wall 23 of the truck transom and at one end or side is swivelled on said axle and removably secured thereon by an axle cap 24. At its opposite side or end, the motor frame has a single transversely projecting lug member 25, and transversely spaced outwardly extending web-like safety stops 26 located close to and above the level of the ends of lug 25.

A transversely extending motor supporting unit is disposed below the lug 25 and carried by brackets 31 mounted on the outer face of the adjacent side wall 23 of the transom.

The supporting unit comprises upper and lower spring bars 28 and interposed helical springs 29, and bolts 30 for connecting bars 28 and holding springs 29 in position.

The brackets 31 are so arranged that when in operative positions they engage the ends of spring bars 28. These brackets are preferably formed of castings and each has an upwardly projecting web 32 and upper and lower horizontal flanges 33 substantially braced by ribs 34.

Transom 3 is provided at the top with a lateral flange 35, having a downwardly extending bead 36, being an integral continuation of the gusset member 4 between the transom 3 and frame 1. The transom is provided at the bottom with a horizontal flange 37 reinforced by rib 38. Brackets 31, when in operative position on the transom, are supported at the bottom by flange 37 and held in position at the top by flange 35 and bead 36. Bolts 39 prevent lateral displacement of the brackets when in operative positions.

In the operative positions of brackets 31, the suspension unit is disposed between motor housing 22 and said brackets, being detachably secured to the under side of lug 25 by bolts 40 and having its ends supported above and below by flanges 33 thereby yieldingly supporting the motor housing 22. In this position of the brackets, safety lugs 26 on the motor housing are disposed above, but spaced a slight extent from, the flanges 33.

By securing the suspension unit to the lug 25 and having the ends of the unit supported by brackets 31, only one lug on the motor housing is required instead of more than one which has been customary, thereby providing a very simple construction of motor housing.

By removing bolts 39, brackets 31 can be laterally adjusted along the transom side wall 23 to clear the ends of the suspension unit, and the motor housing 22 can then be either raised or lowered from its normal position, pivoting about axle 21, thereby affording ready access thereto for minor adjustments or repairs and, with the further removal of axle cap 24, may be entirely removed from the truck frame for major adjustments or repairs without necessitating the removal of other parts of the truck frame. The spring bars 28 are spaced apart a distance slightly less than the distance between the flanges 33 of the brackets 31 so that the brackets can be readily moved into operative position. The spacing of bars 28 can be adjusted by means of nuts 41 on bolts 40.

As the truck frame passes over irregularities in the track, the wheel axles rock slightly in a transverse vertical plane. To facilitate this rocking of the wheel axles without a corresponding strain in the motor supporting means, variation of pressure in opposing vertical directions between bars 28 and flanges 33 is permitted by springs 29 and any excessive downward motion of motor frame, such as might result from failure of the spring supporting unit, is prevented by the safety stop 26 being brought into contact with upper flange 33.

The flanged transom and gusset member provide a strong transom structure and a relatively light bracket may be used. The structure also provides means for supporting the brackets whether in operative or inoperative position, thereby lessening the likelihood of their being removed and misplaced when the motor is being repaired.

Figure 5:
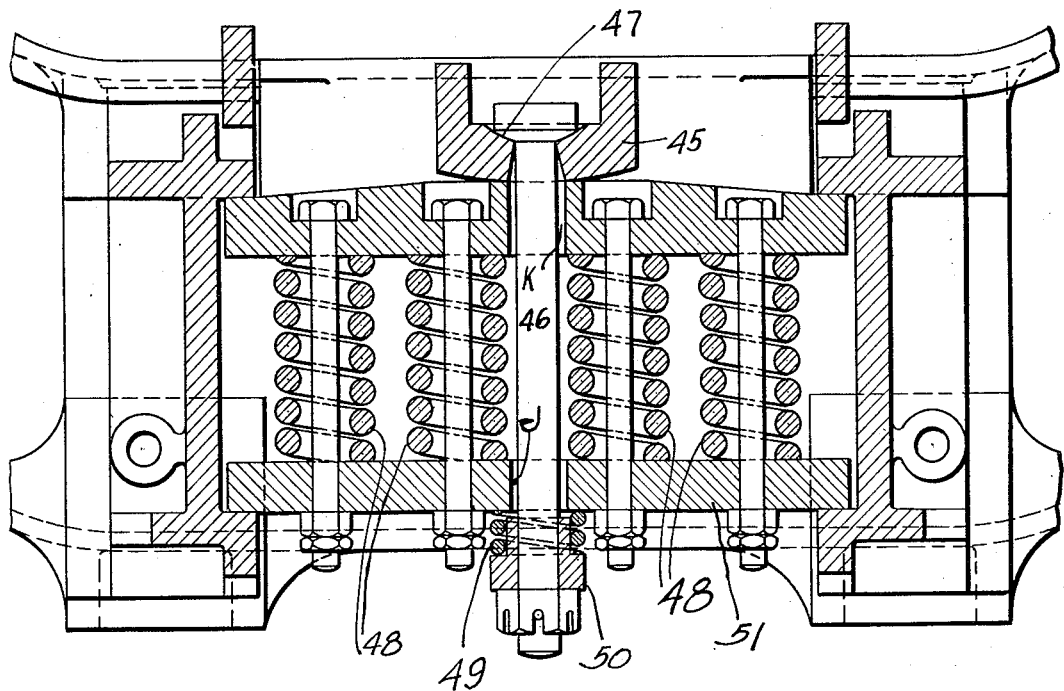
Figure 5 is a section similar to that shown in Figure 3 but illustrates a modified form of invention.

In the modification shown in Figure 5, the motor spring suspension unit is carried by the motor lug 45 by means of a single bolt 46 instead of the two bolts 40 shown in Fig. 3. The head of the bolt fits in a spherical bearing 47 so as to permit rocking movement of the motor in a plane extending transversely of the truck due to tilting of the motor supporting axle as a result of track irregularities. Hence, there is substantially no resistance to the rocking movement of the motor by the springs 48 of the motor suspension unit. In the construction shown in Fig. 3, the motor lug has a bearing substantially the full length of the spring suspension unit and any tilting of the motor in a transverse vertical plane will be resisted by the springs 29 of the spring suspension device. This is a disadvantage for motor trucks which are used in high speed service as the action of the springs is too slow for the tilting action of the axles of the truck. A spring 49 at the lower end of the bolt 46 holds the suspension device against the motor lug 45, while at the same time permitting a little play between the nut 50 and the bottom bar 51 to accommodate rocking movement of the motor. Elongated slots J and K are provided in the bars 51 and 52 to permit lateral movement of the motor relative to the spring suspension device and the truck frame. Pin 46 carries the upward torque of the motor.

It is apparent from the preceding description and accompanying illustrations that the invention embodies a simple form of spring suspension device cooperating with a single lug on the motor frame, and a pair of laterally adjustable brackets and a novel transom structure for mounting the same, combining to give a simple, compact, durable, accessible and inexpensive means for yieldingly supporting the motor frame on the truck frame.

While the use of a yielding suspension means is more desirable, I do not wish to be limited to the particular form shown and described as rigid suspension means of suitable construction may be employed to support the motor housing on the transom member.

Obviously, various features and details of the motor truck which are not essential to my invention as well as modifications in other details herein disclosed may be changed without departure from the scope of my invention.

What is claimed is:

1. In a motor truck, a wheel axle, a truck frame having a transverse transom having an upright web and flanges projecting towards said axle, a motor frame mounted at one end on said axle and having a projection on its opposite end, a bracket movably mounted on said transom flanges and projecting beyond the same towards said axle, a yielding suspension unit detachably secured to said motor frame projection and cooperating with said bracket to support the motor frame and to permit limited vertical movement of said motor frame relative to said transom.

2. In a motor truck, a wheel axle, a truck frame having a side member and an integral transverse transom and a reinforcing gusset merging with said member and transom, a motor frame mounted at one end on said axle and having a lug projecting from its opposite end, a bracket mounted on and slidable along said transom and gusset member, a yielding suspension unit, and means for detachably securing said unit to said lug, said unit and bracket cooperating in one position of said bracket to yieldingly support the motor frame and to permit limited vertical movement thereof relative to the transom and said bracket when slid outwardly on said gusset permitting unobstructed vertical movement of said motor frame either upwardly or downwardly from its normal position to give access thereto for adjustment or repairs.

3. In a motor truck, a wheel axle, a truck side frame, a transom provided on its outer side with an outwardly extending flange at the bottom and an outwardly extending flange at the top, the under face of said top flange being recessed, a motor frame mounted at one end on said axle and having a lug projecting from its opposite end, a bracket supported on said transom lower flange and having an upwardly projecting web fitting in the recess in said top flange, means for positioning said bracket on said transom, and a yielding suspension unit detachably secured intermediate its ends to said motor frame lug and having its end portions engaging with and supported above and below by said bracket to yieldingly support the free end of the motor frame and limit the vertical movement thereof relative to the transom, said bracket being slidable along the transom to permit the unobstructed vertical movement of said unit and adjacent end of said motor frame either upwardly or downwardly from its normal position to give access thereto for adjustment or repair.

4. In a motor truck, a transverse transom comprising spaced side walls and having projecting flanges extending along the upper and lower portions of one side wall, a motor supporting bracket movably disposed between said flanges and having the top and bottom thereof, adapted to be received between and interlocked with said transom flanges and means for detachably securing said bracket in position on said transom.

5. In a motor truck, a truck frame, a wheel axle, a motor frame mounted at one end on said axle and having a single projecting lug on its opposite end, a yielding motor suspension unit, a bracket on said truck frame having vertically spaced portions for engaging upper and lower surfaces of said unit and means for detachably securing the suspension unit to said projecting lug independently of said bracket.

6. In a motor truck, a transverse transom having upper and lower flange elements along one side, at least one of said flanges being grooved along its inner face, a motor supporting bracket slidably mounted on said transom and interposed between said upper and lower flanges of said transom and having vertical elements at its top and bottom portions, at least one of said elements being adapted to engage the grooved portion of one of said flanges to retain the bracket, and means for securing said bracket in desired position along said transom.

7. In a motor truck, a truck frame including a transverse transom having flange portions extending along the upper and lower portions, at least one of said flanges being grooved on its inner side, a supporting bracket interposed between said flanges and slidably mounted on the transom and having elements engaging with said flanges and also having outwardly projecting supporting lugs, a motor movably mounted at one end on the wheel axle, a yielding suspension unit detachably secured to said motor housing and cooperating with said supporting lugs on said bracket to yieldingly support the motor housing and limit the vertical movement thereof relative to the transom.

8. In a motor truck, a wheel axle, a truck frame having a transverse transom, a motor frame mounted at one end on said axle and having a projecting member at its opposite end, a yielding suspension unit mounted on said member and secured to the latter by means of a pin supported by said member and passing through said unit, and a supporting bracket adjustably mounted on said transom and cooperating with said unit to support said motor frame.

9. In a motor truck, a wheel axle, a truck frame having a transverse transom, a motor frame mounted at one end on said axle and having a projecting member at its opposite end, a suspension unit, an element supported by said member and passing through said unit, another element mounted on the lower portion of said first mentioned element, a spring between said second mentioned element and said unit, said first mentioned element being adapted to carry the upward torque of said motor when said spring is compressed and when said second mentioned element engages the underside of said unit, and a supporting bracket adjustably mounted on said transom and cooperating with said unit to support said motor frame.

10. In a motor truck, a wheel axle, a truck frame having a transverse transom, a motor frame mounted at one end on said axle and having a projecting member at its opposite end, a yielding suspension unit, said projecting member having a concave spherical recess, an element supported by said member and having a convex spherical surface at its upper portion, said element engaging said unit and adapted to carry the upward torque of the motor, and a supporting bracket adjustably mounted on said transom and cooperating with said unit to support said motor frame.

11. In a motor truck, a wheel axle, a truck frame having a side member and an integral transverse transom and a reinforcing gusset merging with said side member and transom, said gusset having an extension forming an outwardly extending flange at the upper portion of said transom, a motor frame mounted at one end on said axle and having a lug projecting from its opposite end, a bracket mounted on and slidable along said transom and flange, a yielding suspension unit, and means for detachably securing said unit to said lug, said unit and bracket cooperating in one position of said bracket to yieldingly support the motor frame and to provide for limited vertical movement thereof relative to the transom, and said bracket being slidable outwardly on said flange to provide for unobstructed vertical movement of said motor frame either upwardly or downwardly from its normal position to give access thereto for adjustment or repairs.

12. In a motor truck, a wheel axle, a truck frame having a transverse transom, a pair of movable brackets on said transom, a motor frame mounted at one end on said axle and having a projecting bracket at its opposite end, a yielding motor suspension unit comprising a pair of vertically spaced horizontal bars and springs therebetween, an element for detachably securing said unit to said projecting bracket from below, said unit engaging said movable brackets when the latter are in normal position, said element being adapted to transmit an upward pulling force on said unit and said projecting bracket being adapted to transmit a downward force on said unit, said forces being resisted by said movable brackets and cushioned by said springs.

WILLIAM H. MEYER.